United States Patent [19]

Kobayashi et al.

[11] Patent Number: 4,788,611
[45] Date of Patent: Nov. 29, 1988

[54] MAGNETIC TRANSDUCER HEAD

[75] Inventors: Tomio Kobayashi; Shoichi Kano; Osamu Maniwa; Seiki Konno; Heikichi Sato, all of Miyagi, Japan

[73] Assignee: Sony Corporation, Tokyo, Japan

[21] Appl. No.: 149,977

[22] Filed: Jan. 26, 1988

Related U.S. Application Data

[63] Continuation of Ser. No. 801,318, Nov. 25, 1985, abandoned.

[30] Foreign Application Priority Data

Nov. 26, 1984 [JP] Japan .................................. 59-249127

[51] Int. Cl.⁴ ........................ G11B 5/251; G11B 5/12
[52] U.S. Cl. .................................... 360/120; 360/125
[58] Field of Search ........................ 360/120, 125–127, 360/119, 121–122

[56] References Cited

U.S. PATENT DOCUMENTS

| | | | |
|---|---|---|---|
| 3,502,821 | 3/1970 | Duinker | 360/110 |
| 4,361,860 | 11/1982 | Nozawa | 360/120 |
| 4,531,170 | 7/1985 | Takai et al. | 360/119 |
| 4,559,572 | 12/1985 | Kumasaka et al. | 360/110 |

FOREIGN PATENT DOCUMENTS

| | | |
|---|---|---|
| WO80/02769 | 12/1980 | European Pat. Off. . |
| 2373850 | 12/1977 | France . |
| 43-195 | 1/1968 | Japan . |
| 56-124112 | 9/1981 | Japan .................................. 360/122 |
| 56-169214 | 12/1981 | Japan . |
| 57-15217 | 1/1982 | Japan . |
| 57-189323 | 11/1982 | Japan . |
| 58-122610 | 7/1983 | Japan . |
| 58-175122 | 10/1983 | Japan . |

Primary Examiner—John H. Wolff

[57] ABSTRACT

A magnetic transducer head wherein confronting surfaces of a pair of magnetic core parts comprised of a ferromagnetic oxide material are notched, and the notch defining surfaces have metallic ferromagnetic layers supported thereby. The method of physical vapor deposition as known per se is used for forming these layers. The transducer coupling gap of each magnetic head is defined by an aligned pair of pole piece layers formed from the deposited metallic ferromagnetic material. The pole piece layers are inclined at a preset angle with respect to the plane of the coupling gap, and have extensions formed of the deposited metallic ferromagnetic material presenting bend contours between the pole piece layers and the lateral sides of the core parts.

10 Claims, 8 Drawing Sheets

MAGNETIC TRANSDUCER HEAD

This is continuation of application Ser. No. 801,318, filed Nov. 25, 1985, now abandoned.

BACKGROUND OF THE INVENTION

1. Field of the Invention

This invention relates to a magnetic transducer head and, more particularly, to a composite type magnetic transducer head wherein the gap defining region of the head is formed of thin layers of metallic magnetic material.

2. Description of the Prior Art

In magnetic recording and/or reproducing apparatus, such as video tape recorders (VTRs), the recent tendency has been toward increasing the signal density of the recording medium. In order to increase the recorded signal density, so-called metal powder tapes and so-called metallized magnetic tapes with high coercive force ($H_c$) are being used in increasing numbers. The metal powder tapes make use of powders of ferromagnetic metals such as iron, cobalt or nickel, or alloys thereof, while the so-called metallized tapes utilize a ferromagnetic metallic material coated on a film substrate by means of vapor deposition. Because of the high coercivity of these types of magnetic recording media, a high saturation magnetic flux density ($B_s$) is required of the magnetic core material of the magnetic transducer head, particularly for a head utilized for signal recording operation. With the ferrite magnetic material predominantly used in magnetic recording, the saturation magnetic flux density is rather low, while a metallic magnetic material such as Permalloy presents a problem in that it has a lower wear resistance.

With the above-described tendency toward increasing the recorded signal density, it is desirable to make use of a narrow record track width on the magnetic recording medium, and for this purpose, it is necessary to have a magnetic transducer head coupling gap with a corresponding narrow lateral dimension.

In seeking to meet such requirements, a composite type magnetic transducer head has been previously developed in which a ferromagnetic metallic layer is deposited on a non-magnetic substrate, for example, of a ceramic material, with the thickness of the deposited layer corresponding to the record track width. This type of magnetic transducer head, however, presents a high magnetic reluctance for high frequency signal components because the entire magnetic signal flux path in the head is formed by the low resistivity ferromagnetic metallic layer. Furthermore, since the metallic magnetic layer is produced by physical vapor deposition with its characteristic slow deposition rate, the requirement that the thickness of the deposited layers must equal the track width can lead to a relatively long processing time and consequent materially increased production cost.

A composite type magnetic transducer head is also known in the art in which magnetic core elements are formed of ferromagnetic oxides such as ferrite, and ferromagnetic metallic layers are applied to confronting surfaces of the core elements for defining the transducer gap. However, in this case the path of magnetic flux and the broad surfaces of the metallic magnetic layers are disposed at right angles to each other, and playback output may be lowered because of the resulting eddy current loss. Also, a pseudo gap is produced at the interface between each of the ferrite magnetic core elements add the associated metallic magnetic layer, with a resulting detriment to a desired uniformity of playback frequency response.

RELATED PATENT APPLICATIONS

The following commonly owned pending applications are specifically incorporated herein by reference:

(1) Kobayashi et al application "Magnetic Transducer Head", U.S. Ser. No. 686,540 filed Dec. 26, 1984; and (2) Kubota et al application "Magnetic Transducer Head", U.S. Ser. No. 713,637 filed Mar. 19, 1985.

The above-mentioned U.S. application Ser. No. 686,540 discloses magnetic heads of a composite type suitable for high density recording on high coercivity magnetic record tapes such as the so-called metal powder tapes and metallized magnetic tapes previously referred to. An example of such a head is shown in FIG. 20 of the accompanying drawings wherein a pair of magnetic core elements 101 and 102 of ferrite material have obliquely disposed surfaces 103, 104 on which layers 105, 106 of a metallic magnetic material such as Sendust are deposited by a physical vapor deposition process. The layers 105 and 106 are aligned so that edge faces of the layers define a transducer gap 107 corresponding to a record track width greater than the thickness of the deposited layers. The frontal portions of the ferrite magnetic core elements 101 and 102 are separated from each other at each side of the gap region 107 by non-magnetic filling material 108, 109, 110 and 111. The non-magnetic material 108, 109 extends in flush supporting relationship with record tape engaging edge faces of the deposited layers 105 and 106 so as to protect the deposited layers from wear. The non-magnetic material at 108–111 results in a shape of the magnetic structure of the transducer head in conformity with the desired record track width. By way of example, the material at 108 and 109 in FIG. 20 may be a glass material having a relatively low melting temperature, while the material at 110 and 111 may be a glass material having a relatively high melting temperature. The magnetic head of FIG. 20 exhibits superior characteristics in operational reliability, magnetic performance and wear resistance in comparison to prior art heads.

In the manufacture of the magnetic head of FIG. 20, a pair of core blocks are prepared such that a plurality of individual transducer head chips can be sliced from the core blocks after they have been united in a proper registering relationship. As may be seen from FIG. 20, the composite core parts which include the respective ferrite core elements 101 and 102 may be formed from identically processed core blocks, except that one of the core blocks will receive a groove for forming the winding aperture 112 of the finished core assembly. In an exemplary sequence of manufacturing steps, a ferrite substrate may first receive a series of parallel V-shaped grooves which are then filled with glass of a relatively high melting temperature, such glass ultimately providing the non-magnetic filling material 110, 111 for each individual finished head. As a next step, further V-shaped grooves may be formed between the previously formed grooves. A side wall of each of the further grooves will ultimately correspond with an obliquely disposed surface such as 103 or 104 of a finished transducer head core assembly such as shown in FIG. 20. As a next step in the manufacturing process, the surface formed by each ferrite substrate and its glass-filled first grooves and the further open grooves may now receive a deposited layer of a suitable metallic magnetic material such as Sendust. The open grooves with the deposited layers therein may receive a glass of low melting temperature which eventually provides non-magnetic glass material as shown at 108 and 109 in FIG. 20. The excess of the deposited metallic magnetic material is removed and the resulting surface is polished to a mirror finish to define a planar mating surface. The planar mating surfaces of two such core blocks are placed in confronting relation with a gap spacer material therebetween, and the two core blocks are united to form an assembly which is then sliced along parallel cutting planes to form a plurality of individual head chips. Referring to the individual transducer head chip of FIG. 20, the slicing operation at the parallel cutting planes produces lateral sides 114 and 115.

A magnetic head such as illustrated in FIG. 20 is still not optimum in that lateral edge portions 105a and 106a of the deposited metallic magnetic layers 105 and 106 are cut during the slicing operation in such a way as to detrimentally affect the magnetic properties of the layers 105 and 106. In particular, the magnetic reluctance of the essential magnetic signal flux paths in the layers 105 and 106 is increased, and the useful recording magnetic flux density produced at the gap 107 is reduced during recording operation, and the sensitivity of the transducer head during playback operation is also reduced. It is considered that this detrimental increase in magnetic reluctance of the essential magnetic signal flux paths is caused by differential thermal expansion between the ferrite surfaces such as 103 and 104 and the deposited layers such as 105 and 106 of metallic magnetic material. In particular, it is considered that the mechanical stress caused by the differential thermal expansion leads to the formation of cracks in the deposited layers such as 105 and 106, with a resulting disruption of the uniform magnetic characteristics of the layers as intially formed.

SUMMARY OF THE INVENTION

It is therefore an object of the present invention to overcome the above-mentioned difficulties in relation to the metallic magnetic layers which define the gap region of composite magnetic transducer heads, such that the portions of the deposited metallic magnetic layers forming essential parts of the transducer head magnetic signal flux path are substantially free of detrimental thermally induced stress.

It is a further object of the present invention to provide a method of manufacturing composite magnetic transducer heads which produces heads with improved uniformity of magnetic characteristics and operational reliability; a related object is to provide a composite magnetic transducer head of essentially optimum magnetic characteristics which may be manufactured in an efficient and economical manner, and wherein the portions of deposited metallic magnetic layers essential to the magnetic signal flux path (hereafter termed the magnetic pole piece layers) are isolated from detrimental stress caused by differential thermal expansion at the time of slicing individual transducer head chips from mating and registered core blocks.

It is another object of the present invention to provide a method of mass production of composite magnetic transducer heads wherein the yield rate of magnetic transducer heads with superior magnetic characteristics is notably improved.

In a preferred method implementation of the present invention, core blocks comprised of ferromagnetic oxide material are placed in mating relationship, with obliquely disposed pole piece layers of deposited metallic magnetic material in alignment across an interface region between the confronting core blocks. As viewed in a frontal plane of the core block assembly, the grooves receiving the pole piece layers present notch configurations with first notch defining surfaces which support the pole piece layers, extending obliquely from the respective confronting surfaces. Because of the contour of the grooves, further notch defining surfaces which form continuations of the first notch defining surfaces include bend contours and lateral extensions disposed laterally outwardly of the pole piece layers. By slicing the core block assembly outwardly of the bend contours, the pole piece layers are shielded from thermal stress resulting from the cutting forces. To limit the record tape contacting surface to a desired width, the notch configurations may receive chamfers so that only the pole piece layers have edge faces at the level of the record tape contacting surface and so that the lateral extensions are removed from such surface.

In a preferred magnetic transducer head as produced in accordance with the foregoing method, a composite magnetic core as sliced from a core block assembly has lateral sides which are spaced laterally outwardly from the pole piece layers so that the pole piece layers are essentially free from the thermal stress which has been found to be detrimental in transducer heads such as shown in FIG. 20. Where an optimum magnetic transducer head has pole piece layers forming a straight line completely across the record tape contacting surface, detrimental thermal stress may be avoided by slicing the transducer head chip with an overall lateral dimension greater than the desired width of the record tape contacting surface, and removing unwanted extensions (which extend laterally from the pole piece layers), for example by forming chamfers at the lateral sides of the transducer head. Most preferably, the magnetic transducer head chips are sliced from a composite core block assembly along cutting planes extending laterally outwardly of bend contours which then shield the pole piece layers from detrimental thermal stress due to the cutting forces, so that a stable and highly reliable transducer head is obtained even on a mass production basis.

In a modification, the extensions from the pole piece layers may extend generally away from the interface plane as well as laterally and be of a curved contour and of reduced thickness to isolate the pole piece layers from thermal stress. Further, the cutting planes may be laterally outwardly of respective relatively sharp bend contours in such extensions and intersect lateral extremities of the deposited layers which are relatively thin and extend from the sharp bend contours generally toward the interface plane. The lateral extremities may be removed from the tape contacting surface by chamfering.

Other objects, features and advantages of the present disclosure will be apparent from the following detailed description taken in connection with the accompanying sheets of drawings, from the objects and features of the incorporated disclosures, and from the claims appended to the respective disclosures. It is specifically contemplated that the inventive entity named herein may be enlarged to encompass all such objects, features and advantages.

Exemplary preferred magnetic transducer heads and methods in accordance with the present disclosure will now be explained in the following detailed description which refers to FIGS. 1–19 of the accompanying drawings.

DESCRIPTION OF PREFERRED EMBODIMENTS

Figure 1:
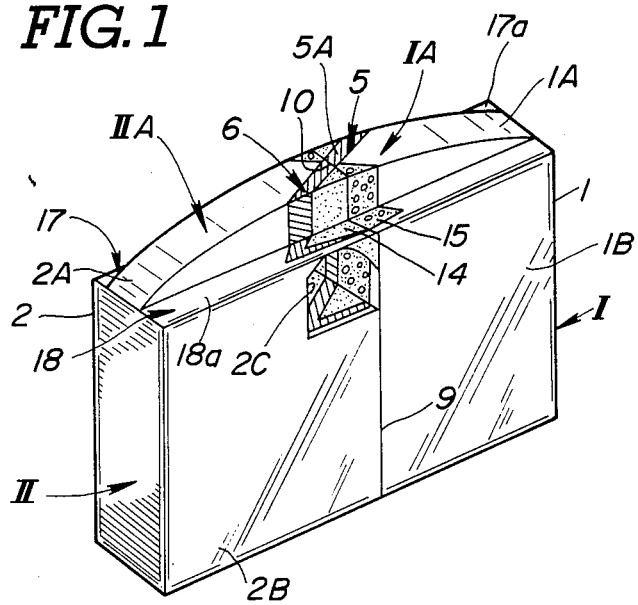
FIG. 1 is a perspective view showing an example of a magnetic head in accordance with the present invention, the head winding being omitted for simplicity of illustration.

In FIG. 1, there is shown in perspective an example of a composite magnetic head embodying the preferred inventive improvements of the present disclosure. The reference numerals I and II designate respective composite core parts which have been united in a prior processing step and then severed along cutting planes parallel to the broad lateral sides of the core parts to form an individual core assembly such as shown in FIG. 1. The core part I comprises a magnetic core element 1 having a frontal portion 1A and a main body portion 1B. The cooperating core part II comprises a magnetic core element 2 having a frontal portion 2A and a main body portion 2B. The magnetic core element 2 is shown as containing a winding slot 2C so that an electric coil can be formed about the signal magnetic flux path provided by the magnetic core element 2.

Figure 2:
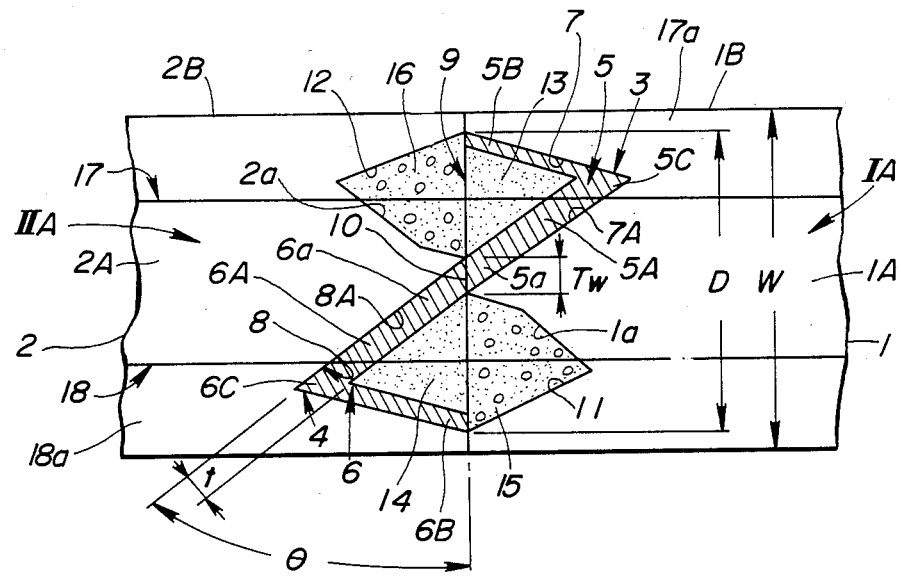
FIG. 2 is a partial enlarged somewhat diagrammatic plan view of the head of FIG. 1, showing the frontal region of the head including the tape contacting surface in the vicinity of the gap.

In FIG. 2, frontal surface portions IA and IIA of the composite core parts I and II are shown in an enlarged plan view restricted to the gap region. In FIG. 2, the width of the main body portions 1B and 2B is designated by the letter W. By way of example, magnetic core elements 1 and 2 may be formed of a ferromagnetic oxide material such as manganese-zinc ferrite. As viewed in FIG. 2, the composite core parts present respective notch configurations 3 and 4 which contain respective layers 5 and 6 of metallic magnetic material. The layers 5 and 6 include aligned parts 5A and 6A, herein termed the magnetic pole piece layers, which include record tape engaging edge faces 5a and 6a, FIG. 2, and which provide essential portions of the magnetic recording signal flux path of the transducer head. The pole piece layers 5A and 6A extend in close conforming relation to obliquely disposed portions 7A and 8A of notch defining surfaces 7 and 8. In one embodiment, the layers 5 and 6 are formed by depositing metallic magnetic material on the notch defining surfaces 7 and 8 by a vapor deposition process.

As illustrated in FIG. 2, the surfaces 7A and 8A each form an angle with an interface plane which coincides with an interface region 9 between the composite core parts I and II. The pole piece layers 5A and 6A are shown as having a substantially uniform thickness t. The pole piece layers 5A and 6A have confronting edge faces lying at opposite sides of the interface region 9 and defining therebetween a transducer coupling gap 10 for coupling the magnetic transducer head with a track of a magnetic tape record medium, the lateral extent of the gap 10 essentially defining a track width dimension Tw which may be taken as representing the record track width which is to be scanned by the transducer head during recording and/or playback.

As viewed in FIG. 2, the composite core parts exhibit recess configurations 11 and 12, and the layers 5 and 6 are shown as defining further recess configurations. The recess configurations associated with layers 5 and 6 are filled with non-magnetic material as indicated at 13 and 14 while the recess configurations 11 and 12 contain non-magnetic material as indicated at 15 and 16. By way of example, a glass of relatively high melting temperature may serve as non-magnetic materials 13 and 14, while a glass with a relatively lower melting temperature can be utilized for the non-magnetic materials 15 and 16.

The interface region 9 may be formed by a gap material such as silicon dioxide ($SiO_2$) which is applied to one or both of the mating surfaces of the composite core parts I and II. The angle $\theta$ between the respective obliquely disposed surfaces 7A and 8A which support the pole piece layers 5A and 6A, and the plane of interface region 9 is preferably in the range from twenty degrees to eighty degrees. With angle $\theta$ less than twenty degrees, cross-talk from the neighboring tracks is increased, and accordingly the angle $\theta$ is preferably selected to be larger than thirty degrees. The angle $\theta$ is also selected to be less than about eighty degrees because wear resistance is severely reduced as the angle $\theta$ approaches ninety degrees. With the angle $\theta$ equal to ninety degrees, the deposited metallic magnetic layers 5 and 6 must have a thickness equal to the track width Tw. This is not desirable because the operation of depositing a layer with the aid of a physical vapor deposition is extremely time consuming; further, as the thickness of the layer increases, the structure of the layer becomes less uniform, and the magnetic properties of the transducer head are correspondingly degraded.

Referring to the geometry illustrated in FIG. 2, it will be observed that the thickness t of the deposited pole piece layers 5A and 6A is less than the track width according to the relationship:

$$t = T_w \sin \theta$$

where Tw designates the track width and $\theta$ is the angle between the respective obliquely disposed surfaces 7A and 8A and the plane of the interface region 9. Accordingly, by appropriate selection of the angle $\theta$, the film thickness t may be reduced in comparison with the track width Tw so that the time involved in the manufacture of the magnetic head may be correspondingly reduced.

The materials of the metallic magnetic layers 5 and 6 may include non-crystalline ferromagnetic metallic alloys, i.e. so-called amorphous alloys, for example metal-metalloid amorphous alloys, such as alloys composed of one or more metals from a group comprised of iron (Fe), nickel (Ni) and cobalt (Co), and one or more elements from a group comprised of phosphorous (P), carbon (C), boron (B), and silicon (Si), or alloys mainly consisting of elements from these groups and also including aluminum (Al), germanium (Ge), beryllium (Be), tin (Sn), indium (In), molybdenum (Mo), tungsten (W), titanium (Ti), manganese (Mn), chromium (Cr), zirconium (Zr), hafnium (Hf) or niobium (Nb), or metal-metal amorphous alloys mainly consisting of cobalt (Co), hafnium (Hf) or zirconium (Zr); iron-aluminum-silicon alloys (Sendust alloys); iron-aluminum alloys; and nickeliron alloys (Permalloys). Deposition of the desired layers herein can be achieved by any conventional method of physical vapor deposition, such as flash evaporation, gas evaporation, ion plating, sputtering and cluster ion beam deposition.

The recess configurations of the transducer head which contain the non-magnetic materials 13, 14, 15 and 16 shape the magnetic structure of the head so as to concentrate the signal magnetic flux at the region of gap 10 while providing a transducer head tape contacting surface of great stability and wear resistance.

As viewed in FIG. 2, the deposited metallic magnetic layers 5 and 6 have a generally V-shaped configuration, with the pole piece layers 5A and 6A joined with lateral extremities 5B and 6B of substantially reduced thickness by means of respective bends 5C and 6C. The lateral extremities of the deposited layers at 5B and 6B are spaced in a depth direction from the level of the tape contact surface of the head as best seen in FIG. 1 for the case of extremity 6B. Referring to FIG. 1, it will be observed that the main regions 5A and 6A of the layers 5 and 6 extend from a level flush with the transducer head tape contacting surface to a substantial depth corresponding to the depth dimension of the transducer gap 10. In the embodiment of FIGS. 1 and 2, the offsetting or removal of the layer portion 5B, 5C and 6B, 6C from the level of the transducer head tape contacting surface is effected by chamfering the composite core parts I and II to form L-shaped steps 17 and 18 as best seen in FIG. 1.

As will be explained hereinafter with reference to FIGS. 8 and 9, the lateral dimension D which is shown in FIG. 2 and represents the overall lateral span of the pair of juxtaposed notch configurations 3 and 4 is selected in this embodiment so as to be smaller than the thickness W of the main body portions 1B and 2B of the transducer head. In this way, when a pair of mated and registered core blocks are sliced to form individual magnetic head chips such as shown in FIGS. 1 and 2, cutting takes place in laterally spaced relationship to the pair of aligned pole piece layers 5A and 6A so that these layers are isolated from the thermal stress caused by the cutting operation. As a result, the pole piece layers 5A and 6A retain their original magnetic properties and in particular the formation of cracks in the layers 5A and 6A which would be detrimental to the magnetic properties are avoided.

With the above-described magnetic head, the lateral extremities 5B and 6B of the deposited layers of metallic magnetic material extend from the bends 5C, 6C in a direction generally toward the interface region 9 as seen in FIG. 2. If such lateral extremities 5B and 6B were located at the transducer head tape contacting surface, so-called pseudo magnetic gaps would be formed; however, according to the present embodiment, the surfaces 17a, 18a containing the lateral extremities 5B and 6B and the adjoining lateral margin portions of the core elements 1 and 2 are offset from the level of the tape contacting surface, so that only the desired transducer gap 10 defined by the pole piece layers 5A and 6B is present at the tape contacting surface.

The following description of a preferred method of manufacture of the magnetic transducer head of FIGS. 1 and 2 will serve to provide a further understanding of the structure of this embodiment.

Figure 3:
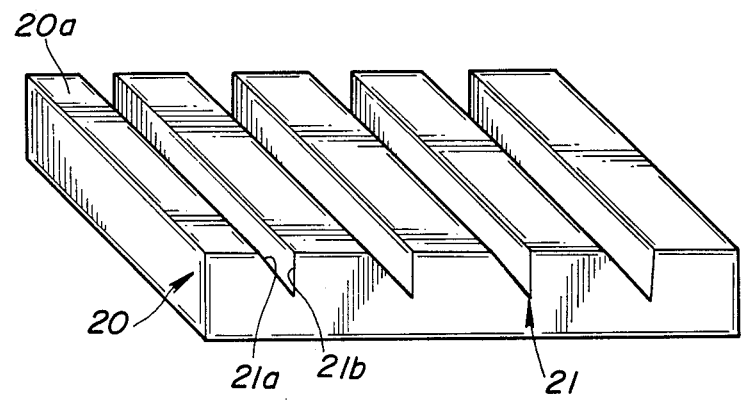
FIG. 3-9 are schematic perspective views showing exemplary sequential steps in a manufacturing process for producing the head shown in FIGS. 1 and 2.

In the method step illustrated in FIG. 3, a plurality of spaced vee grooves 21 are formed with a grinding wheel assembly (not shown) which groves open at an upper surface 20a of a substrate 20 and provide obliquely disposed surfaces such as indicated at 21a. The surface 20a may be regarded as a mating or confronting surface since two such surfaces of respective similar substrates after further processing are mated in confronting relation as shown in FIG. 8. The mating surface 20a is parallel with the interface plane of the head assemblies which are ultimately formed. The obliquely disposed surfaces 21a are inclined at the selected angle $\theta$ (FIG. 2) with respect to the plane of surface 20a. In the present embodiment, the angle $\theta$ is selected to be about forty-five degrees.

Figure 4:
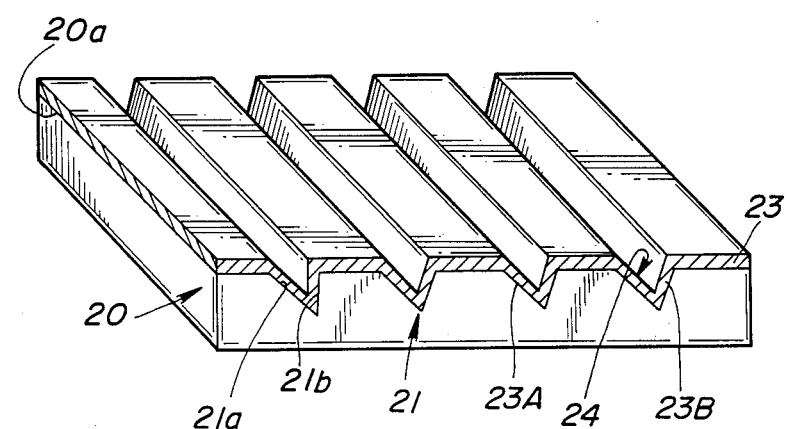

As illustrated in FIG. 4, a metallic magnetic layer 23 of Sendust or the like is applied to the grooved side of substrate 20 so as to a form layer portions 23A with a layer thickness t on the obliquely disposed surfaces such as 21a in FIG. 3. The layer 23 at its exterior (upper) side provides surface portions parallel to the surface 20a and recesses 24 generally conforming with the contour of the original grooves 21. The layer 23 may have a reduced thickness at portions such as 23A, FIG. 4, which are deposited at the sides 21b of the grooves 21, corresponding to the reduced thickness of the individual layers such as 5 and 6 of FIG. 2 at the respective extremities 5B and 6B in FIG. 2. Where the layer 23 is formed by physical vapor deposition, for example by sputtering, the substrate 20 may be held at such an angle to the sputtering apparatus that material is preferentially deposited at the respective oblique surfaces such as 21a, while the desired reduced thickness of deposited material is produced at the surfaces 21b of the vee grooves 21.

Figure 5:
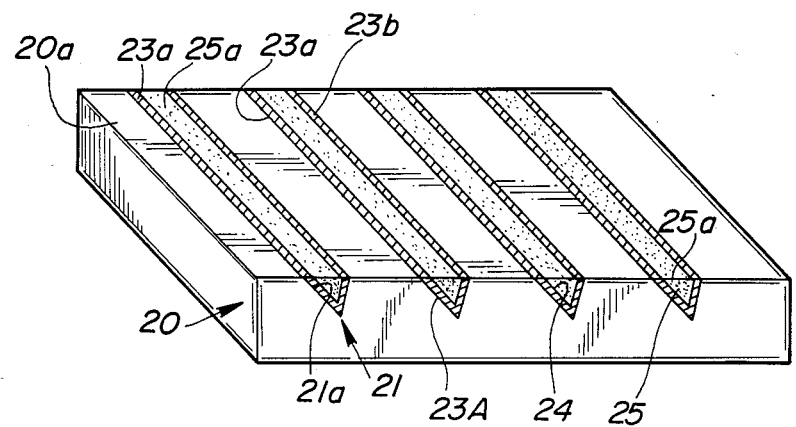

As shown in FIG. 5, the recesses 24, FIG. 4, may now be filled with non-magnetic material 25, such as glass with a high melting temperature. The surface with layer 23 thereon, FIG. 4, is now ground smooth so that the edge portions such as 23a and 23b of the deposited metallic magnetic layer 23 are flush with the substrate surface 20a to provide an essentially continuous smooth flat planar surface over the entire grooved side of the substrate 20.

Figure 6:
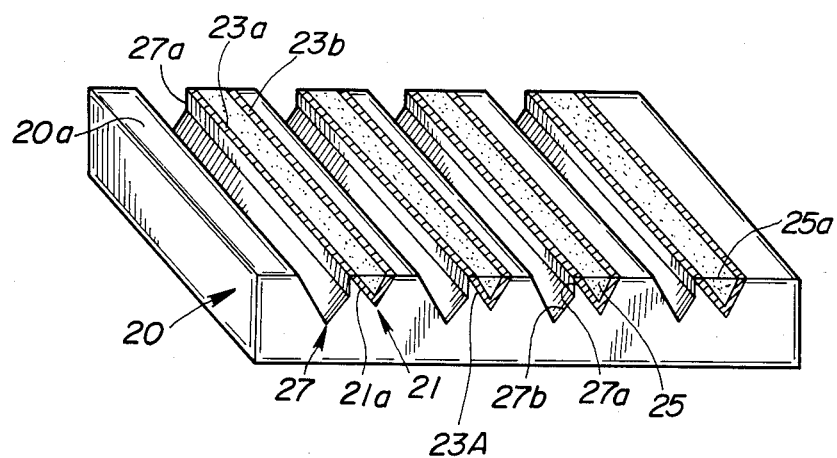

Then, as shown in FIG. 6, a second set of grooves 27 is milled parallel with the original vee grooves 21, FIG.

3, with each of the grooves 27 closely approaching an edge portion 23a of a respective deposited pole piece layer 23A (this step providing the recesses such as indicated at 11 and 12 in FIG. 2 which extend into close proximity to the margins of the gap 10). The mating surface 20a of the substrate and the coplanar surfaces 23a and 23b of layer 23 and coplanar surfaces 25a of the non-magnetic material 25 are then ground to a mirror finish. The grooves 27 may slightly overlap with the adjacent margins of the pole piece layer edge faces 23a, eliminating the presence of magnetic substrate material at the lateral extremities of the transducer head coupling gaps corresponding to gap 10 in FIG. 2. The combined lateral extent of the grooves 21 and 27 corresponds to the dimension D in FIG. 2 and in this embodiment is selected so as to be smaller than the slicing width represented at M in FIG. 8 and substantially corresponding with the width W shown in FIG. 2.

The second grooves 27, FIG. 6, may, for example, be polygonal in cross-section so that the inner wall surface of each slot 27 is bent in two or more steps, with surfaces such as indicated at 27a adjoining the pole piece layers 23A having a desirable relatively steep angle relative to the plane of surface 20a, FIG. 6. The contour of the slots 27 is selected for assuring a desired distance between the magnetic oxide material, for example, of core element 1, FIG. 2, and the metallic magnetic layer such as 6A, FIG. 2. The profile of the grooves 27 is selected to reduce cross-talk components at the longer recorded wavelengths during playback operation. The magnetic oxide material of the core elements 1 and 2 supports the pole piece layers 5A and 6A, FIG. 2, in close conforming relation over the entire extent of the pole piece layers 5A and 6A at the tape contacting surface and over a depth dimension corresponding to the depth dimension of the gap 10, the depth dimension of the gap 10 being limited by the presence of the slot 2C in the core element 2B, FIG. 1. The profile of the slots 27, FIG. 6, also allows the confronting faces of the magnetic oxide material of the core elements 1 and 2 to be inclined relative to the plane of gap 10 to avoid spurious recording in the scanning direction of the head while also reducing crosstalk or signal pickup from adjacent, and next adjacent, tracks during playback operation. Pickup from adjacent tracks, for example, is inhibited because of the azimuth loss introduced as a result of the oblique angle of surfaces such as indicated at 1a and 2a in FIG. 2 which result from the contour of grooves 27 at 27a and 27b, FIG. 6, for example.

Figure 7:
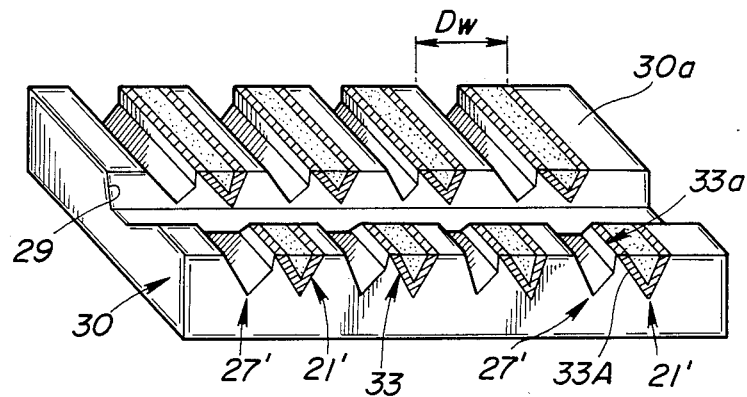

FIG. 7 shows a core block comprising of a second substrate 30 processed as shown in FIGS. 3 through 6, but thereafter having a groove 29 formed in a direction at right angles to grooves 21' and 27' which correspond to the grooves 21 and 27 of substrate 20. The groove 29 provides the winding slots such as indicated at 2C in FIG. 1 for the respective individual core assemblies to be formed. The substrate comprises deposited layers 33 of metallic magnetic material providing pole piece layers 33A with pole piece edge faces 33a. The core block including substrate 30 is provided with a grooved side including surface 30a, having a mirror finish so as to provide a flat planar surface for mating with the flat planar surface including the surface 20a of FIG. 6. FIG. 7 shows a total span of a groove 21' and an adjoining groove 27' of Dw which corresponds to the dimension D in FIG. 2. A gap spacer material is deposited on the polished mating surface including the surface 20a of the substrate 20, FIG. 6, and/or on the polished surface which includes the surface 30a of the substrate 30, FIG. 7, so that the aligned layer edges 23a and 33a will have gap material therebetween establishing the desired longitudinal gap dimension therebetween. Then, as shown in FIG. 8, the core blocks comprised of substrate 20, FIG. 6, and substrate 30, FIG. 7, are mated and registered relative to one another so that respective pairs of deposited pole piece layers 23A and 33A are in alignment with each other as shown in FIG. 8 to define transducer gaps corresponding to the gap 10 of FIG. 2. The core blocks comprised of the processed substrates 20 and 30 are bonded together by glass, and the grooves 27 and 27' are filled with respective non-magnetic glass material 28 and 28'. The gap material for forming the interface regions such as 9, FIG. 2, and for providing the transducer gaps such as 10 may be selected from a group comprised of silicon dioxide ($SiO_2$), zirconium dioxide ($ZrO_2$), tantalum pentoxide ($Ta_2O_5$) and chromium (Cr).

Figure 8:
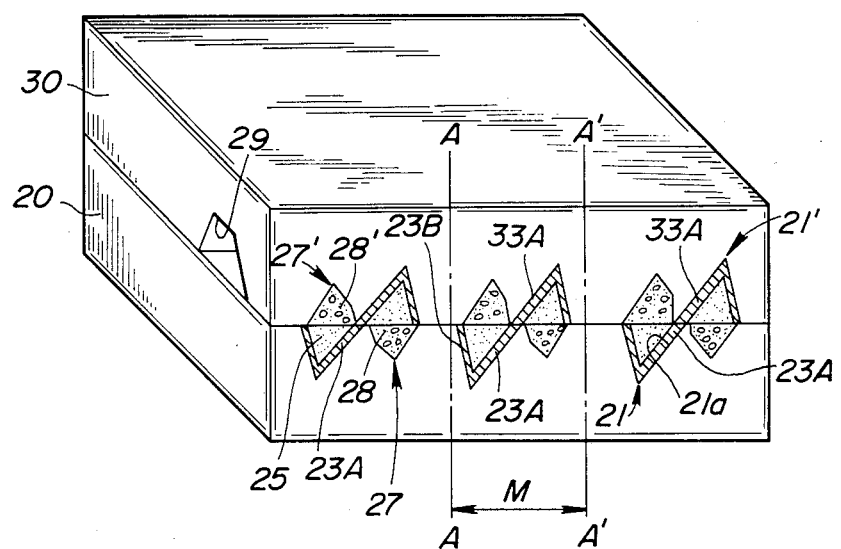

The mating core blocks formed by the processed substrates 20 and 30 are then sliced along lines such as A—A and A'—A' in FIG. 8 having a separation M, FIG. 8, which is greater than the dimension Dw, FIG. 7, and greater than the dimension D of FIG. 2. The result is a plurality of head chips such as indicated in FIG. 9, each such chip or core assembly having lateral sides such as indicated at 38 and 39 which are flat and planar and disposed at right angles to the interface plane between the core parts, such lateral sides 38 and 39 of the transducer head defining a width W such that the sides 38 and 39 are spaced laterally outwardly from the extremeties 5B and 6B of the layers 5 and 6. With this arrangement, the essential flux path defining portions 5A and 6A of the metallic magnetic layers 5 and 6 are thermally isolated from the lateral sides 38 and 39 so as to be free of detrimental thermal stress resulting from the cutting forces applied at the cutting planes A—A and A'—A' during severing of the core parts from the mated core blocks of FIG. 8. Accordingly, it is found that the layers 5A and 6A retain the desirable uniform magnetic properties that the layers had in their condition as shown in FIGS. 6 and 7 prior to the slicing operation of FIG. 8.

Figure 9:
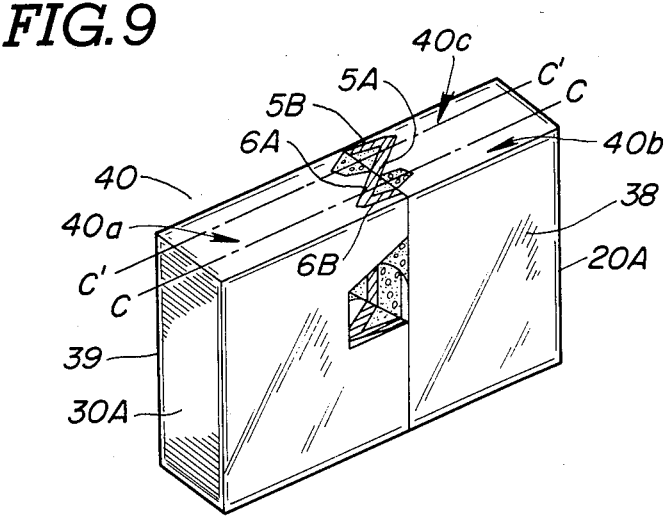

As illustrated in FIG. 9, an individual head chip 40 such as is obtained as indicated in FIG. 8, comprises a portion 20A of the substrate 20, FIG. 8, and a portion 30A of the substrate 30, FIG. 8. In order to form the transducer head record tape contacting surface from the core material at 40a, the material at 40b and 40c laterally outwardly of the lines C—C and C'—C' in FIG. 9 are ground off in a chamfering operation, and the remaining surface of portion 40a, FIG. 9, is ground to a segmental cylindrical configuration for completing the magnetic head such as shown in FIGS. 1 and 2. By chamfering the longitudinal edges 40b and 40c, FIG. 9, the pseudo gaps otherwise formed at margins 40b and 40c, FIG. 9, are separated from the level of the tape contact surface formed at the central portion 40a, FIG. 9. The longitudinal edges 40b and 40c may be chamfered to form beveled surfaces instead of the stepped surfaces as indicated at 17 and 18 in FIG. 1.

In the above described manufacturing process, it is not essential that the glass material 28 and 28' be charged into the respective second grooves 27 and 27' of FIGS. 6 and 7 at the same time that the core blocks formed by the processed substrates 20 and 30 are bonded to each other. For example, the processing operations of FIGS. 6 and 7 may include the step of charging the glass material 28 and 28' into the second grooves 27 and 27', whereas the step of FIG. 8 may include only the glass bonding step where the core blocks are bonded together as a unitary assembly.

Figure 10:
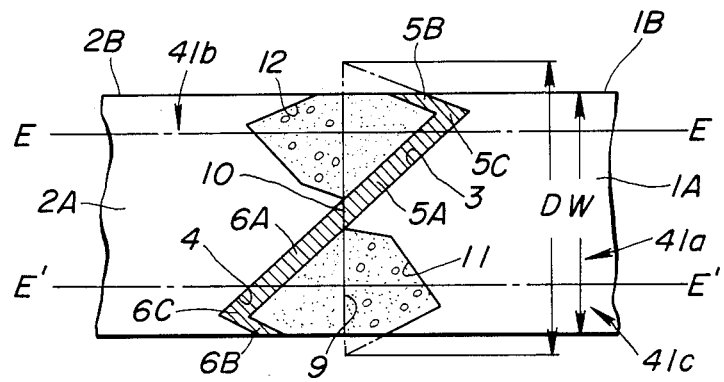
FIG. 10 is a partial enlarged plan view showing frontal regions of a core assembly which has been severed along cutting planes having a separation W, rather than along cutting planes having a separation greater than D (as is illustrated in FIG. 9)

The preferred embodiments of the present invention are not limited to the above described embodiment. For example, as shown in FIG. 10, the width of the juxtaposed notch configurations 3 and 4, and also the overall lateral span of the recess configurations 11 and 12 may be selected to have a value (indicated at D in FIG. 10) so as to be slightly larger than the width W of the magnetic core body portions 1B and 2B. In this example the cutting planes intersect lateral extremities 5B and 6B of the deposited metallic magnetic material which lateral extremities lie laterally outwardly of the bends 5C and 6C (as viewed in relation to the associated transducer gap 10). The thickness of the deposited metallic magnetic material is substantially less in these lateral extremities 5B and 6B so that a disruption due to the thermal stress of the cutting operation is less likely to be transmitted to the magnetic pole piece layers 5A and 6A. Generally in each of the preferred embodiments, the thinner the deposited metallic magnetic material at the lateral extremeties, the less likely it is that thermal stress will be transmitted to the pole piece layers in the vicinity of the transducer gap 10. It is noted that the longitudinal edge portions 41b and 41c of the core parts which lie outside of the lines E—E and E'—E' are chamfered for removing them from the record tape contacting surface which is provided at a central region 41a corresponding to the regions IA and IIA of FIG. 1.

Figure 11:
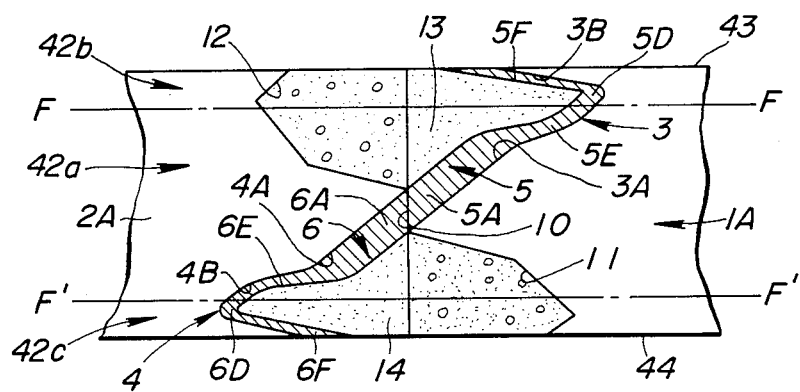
FIG. 11 is a partial enlarged plan view similar to that of FIG. 10 but showing a further modification in accordance with the present invention.

As a further modification, as shown in FIG. 11, the juxtaposed notch configurations 3 and 4 may be of a sinuous profile at the extensions 3B and 4B of the first notch defining surfaces 3A and 4A. In this example, the deposited metallic magnetic material of layers 5 and 6 may be formed with substantially conforming S-shaped bends including relatively sharp reverse bends at 5D and 6D, with regions 5E and 6E being of progressively reduced thickness and curving generally away from the interface plane, and being located between the pole piece layers 5A and 6A and the relatively sharp bends 5D and 6D, and with lateral extremities 5F and 6F being of substantially reduced thickness and extending from the relatively sharp bends 5D and 6D in a direction generally toward the interface plane as well as generally laterally outwardly. In the illustrated example, the cutting planes intersect the lateral extremities 5F and 6F which lie laterally outside of the sharp bends 5D and 6D to form the lateral sides 43 and 44 of the individual transducer head chip. As in the preceeding embodiment of FIG. 10, there is no risk of detrimental disruption of the deposited pole piece layers 5A and 6A in the vicinity of the transducer gap 10 or crack formation in the closely conforming notch defining surfaces 3A and 4A of magnetic oxide material. Thus, in the embodiments of FIG. 10 and FIG. 11, the pole piece layers 5A and 6A are essentially free of detrimental thermal stress which might lead to detrimental cracks in the pole piece layers. In FIG. 11, the lateral margin portions 42b and 42c outside of the lines F—F and F'—F' are removed by chamfering in correspondence with the embodiment shown in FIG. 1. Thus, the sharp bends 5D and 6D and the lateral extremities 5F and 6F are removed from the record tape contacting surface formed at 42a.

As a modification, the metallic magnetic layers may be provided solely in the vicinity of the coupling gap of the magnetic transducer head.

Figure 12:
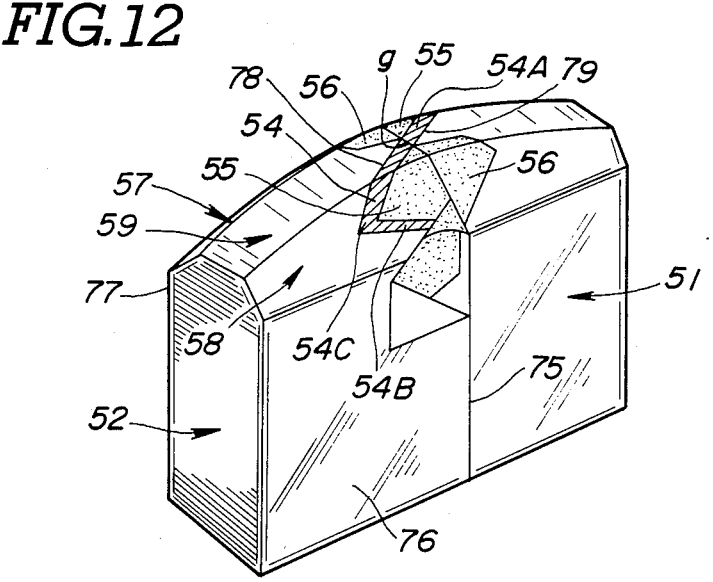
FIG. 12 is a perspective view showing an embodiment of the present invention wherein the metallic magnetic layers are provided only to a limited depth below the record tape contacting surface of the transducer head.

FIG. 12 shows a modified magnetic transducer head wherein the metallic magnetic layers are provided solely in the vicinity of the coupling gap. The magnetic head is comprised of a pair of core elements 51 and 52 of a ferromagnetic oxide material such as manganese-zinc ferrite, and it is only on frontal portions of the core parts in the vicinity of the magnetic gap g that the metallic magnetic layers 54 of a high permeability alloy such as Sendust are deposited by a vacuum film formation technique such as sputtering. Reference numerals 55 and 56 designate non-magnetic filling material, for example glass filling material, charged in a molten state into recess configurations disposed at the respective lateral margins of the gap g. As in the preceding preferred embodiments, pole piece layers 54A forming essential portions of the magnetic flux path of the head are of substantially uniform magnetic characteristics, and are essentially free of detrimental thermal stress so as to provide a magnetic transducer head with optimum, extremely stable magnetic properties and capable of reliable operation over an extended useful life.

In the embodiment of FIG. 12, longitudinal edge portions 57 and 58 on both sides of the record contacting surface 59 are obliquely removed by a chamfering operation.

The magnetic transducer head of FIG. 12 may be prepared by the steps shown in FIGS. 13 to 19.

Figure 13:
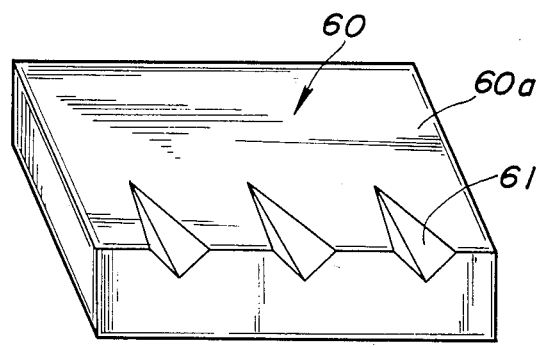
FIGS. 13–19 are perspective views showing exemplary sequential steps of a manufacturing process for producing the magnetic head shown in FIG. 12.

Referring first to FIG. 13, with the aid of a grinding wheel or electro-etching, a plurality of equally spaced dihedral grooves 61 are formed at a transverse edge of a substrate 60 of a ferromagnetic oxide material such as manganese-zinc ferrite. The upper surface 60a as viewed in FIG. 13 of the substrate 60 forms part of the mating surface of a core block as in the preceding example. However, the grooves 61 are formed at only a portion of the surface 60a which will correspond to the vicinity of the transducer head coupling gaps of the individual magnetic transducer head chips which are to be formed from a pair of such core blocks.

Figure 14:
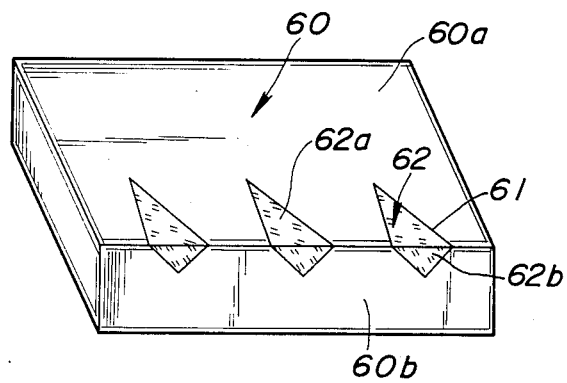

As shown in FIG. 14, glass material 62 is filled in a molten state in each groove 61, and the surfaces such as 62a and 62b are then ground smooth to provide a planar mating surface and a planar frontal surface of the core block.

Figure 15:
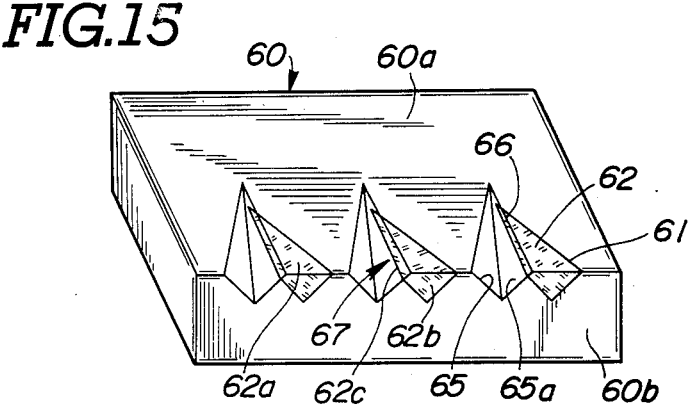

As shown in FIG. 15, a plurality of second grooves 65 are formed so as to be adjacent to and partially overlapped with the grooves 61 which are filled with the glass material 62. In forming the grooves 65, a part 62c of the glass material 62 is exposed to form part of a notch defining surface along with the groove wall 65a of each groove 65. Each of the resultant notch defining surfaces 67 intersects the plane of the upper surface 60a along a line 66 which extends at right angles to a frontal plane defined by front surface 60b of the substrate 60. Each of the notch defining surfaces 67 forms a preselected angle, for example of forty-five degrees, with the plane defined by the upper surface 60a. The combined width of each pair of adjoining grooves 61 and 65, as viewed in the frontal plane defined by front surface 60b of the substrate may be selected so as to be slightly smaller than the width (corresponding to the dimension W, FIG. 2) of each head chip obtained after the slicing step as later described.

Figure 16:
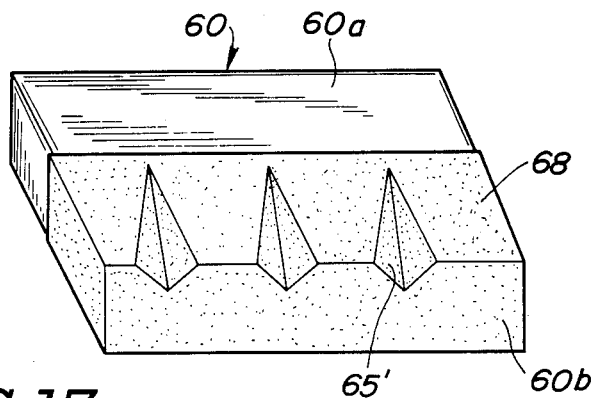

Then, with the aid of a physical vapor deposition process, such as sputtering, a metallic magnetic material, for example a high permeability alloy such as Sendust, is deposited as a thin layer 68, as shown in FIG. 16, which covers at least the second grooves 65 to leave residual recesses 65', FIG. 16. In this process step, the substrate 60, FIG. 15, is placed in a sputtering unit in an inclined position for more efficient deposition of the high permeability alloy material on the notch defining surfaces such as indicated at 67 in FIG. 15. Thus, the deposited layer is of substantially reduced thickness at the lateral extremities such as 54B, FIG. 12, in comparison to the thickness at the pole piece layers such as 54A, FIG. 12, in the resultant individual transducer head chips.

Figure 17:
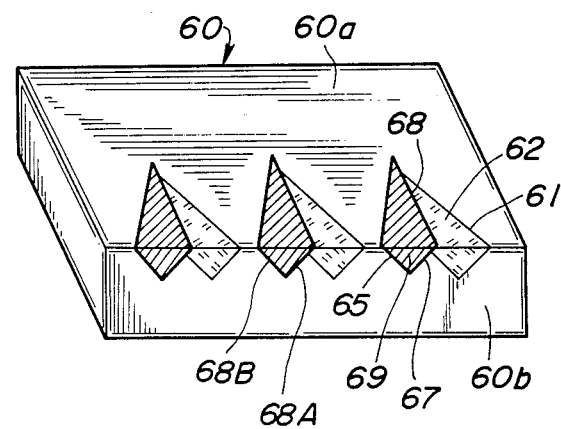

Then, as shown in FIG. 17, a glass material 69 which has a lower melting temperature than the previously applied glass material 62 is charged in a molten state into the recesses 65' defined by the second grooves 65 with their lining of deposited metallic magnetic material 68, FIG. 16. The core block sides including upper surface 60a and the front surface 60b are then ground to a mirror finish. At this time, part of the deposited metallic magnetic material 68 remains in the second grooves 65 so that, when looking at the frontal plane of the core block defined by front side 60b of the substrate 60, vee layer configurations comprising layer segments 68A and 68B remain deposited on the walls of the second grooves 65.

Figure 18:
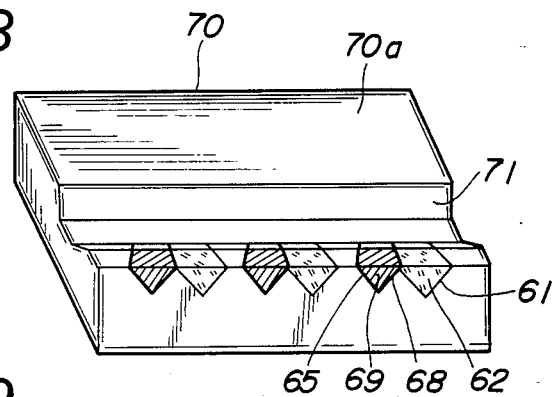

For providing core parts with winding slots, a second core block, similar to that including the magnetic oxide substrate 60, FIG. 17, is subjected as a further step to the forming of a winding groove 71, FIG. 18. The result is a second core block including a substrate 70 of ferromagnetic oxide material providing a planar mating surface including surface 70a, FIG. 18.

Figure 19:
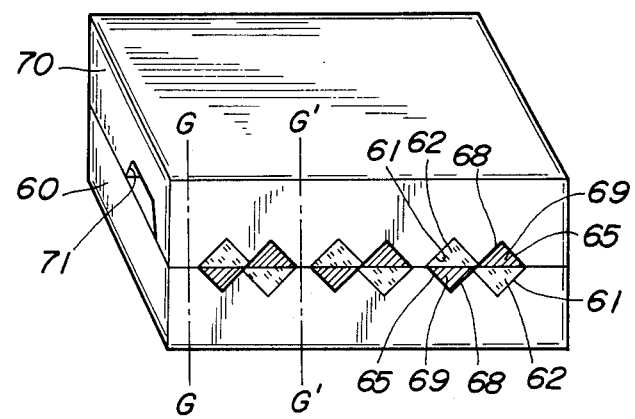
Figure 20:
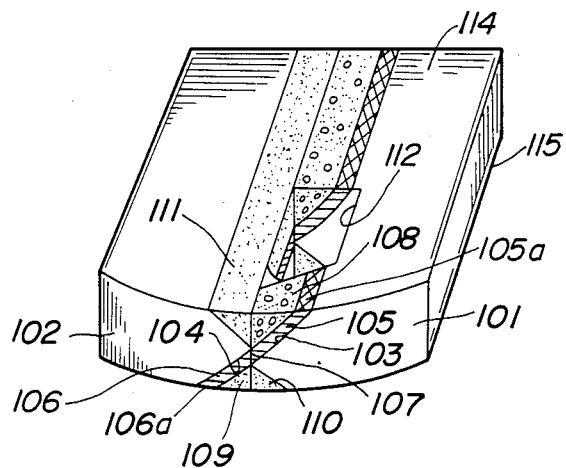
FIG. 20 is a perspective view showing a type of composite magnetic transducer head which is disclosed in greater detail in a commonly owned related patent application U.S. Ser. No. 686,540, which has been incorporated herein by reference; the structure of the head of FIG. 20 and an exemplary method of making the same are briefly described hereinabove under the heading RELATED PATENT APPLICATIONS.

The mating surfaces of the core blocks formed of the processed substrates 60 and 70 are superimposed upon each other as shown in FIG. 19 with the mating surfaces including surfaces 60a and 70a disposed in confronting relation and separated only by a deposited gap spacer material as in the preceding embodiment. The core blocks including the substrates 60 and 70 are then bonded to each other by molten glass. The resulting unitary core block assembly comprised of the substrates 60 and 70 is sliced along lines such as G—G and G'—G' in FIG. 19 to form a plurality of individual transducer head chips.

The record tape contacting surface of each resulting transducer head chip is ground to a segmental cylindrical surface such as indicated at 59, FIG. 12, while the longitudinal edges of the chip on both sides of the tape contacting surface 59 are ground off to provide chamfered or beveled lateral margins 57 and 58 for completing the magnetic head as shown in FIG. 12.

The magnetic head of FIG. 12 as prepared by the method steps of FIGS. 13 through 19 is of a superior character because it is capable of high yield mass production and because there is no risk of formation of detrimental cracks in the pole piece layers such as 54A or in the notch defining surfaces 78 and 79, as has already been explained in reference to the preceding preferred embodiments. Furthermore, the embodiment of FIGS. 12-19 substantially reduces the required volume of high permeability alloy by restricting the deposition process to the region of the transducer gaps of each head chip. The required amount of glass or other non-magnetic material is also substantially reduced in comparison to the embodiment of FIGS. 1 through 9. The heads of FIGS. 10 and 11 may be prepared by the method of FIGS. 3 through 9 or by the method of FIGS. 13 through 19.

For each of the preferred magnetic head configurations described herein, the pole piece layers of deposited metallic magnetic material extend obliquely to the interface plane in the vicinity of the coupling gap and form a selected acute angle of substantial magnitude, for example in the range between about twenty degrees and about eighty degrees. In addition, the notch configurations provide relatively sharp bend contours between the pole piece layers and the lateral margins of the head so that the pole piece layers are essentially free of detrimental thermal stress and so that the formation of cracks in the pole piece layers or in the adjoining oxide ferromagnetic material as the result of slicing of the head chips from a core block assembly is notably reduced. Further, the preferred methods of the present disclosure enable the production of magnetic transducer heads with stable magnetic characteristics and with a long reliable operating life. Because of the shielding of the deposited magnetic pole piece layers from the thermal stress of the slicing operation, the danger of crack formation in the pole piece layers or in the supporting ferromagnetic oxide material is notably reduced so that the occurence of rejects is minimized.

In addition, the volume of glass or like non-magnetic material to be charged into the track width controlling recess configurations is reduced because of the presence of the reverse bends in the notch configurations so that crack formation in this non-magnetic material, in the deposited pole piece layers or in the supporting magnetic oxide material may be prevented from occuring.

While several preferred embodiments have been illustrated and described in detail, it will be apparent to those skilled in the art that many changes and modifications may be made without departing from the disclosed invention in its broader aspects; and it is intended that the appended claims cover all such changes and modifications as fall within the true spirit and scope of the contributions to the art made hereby.

We claim as our invention:
1. A magnetic transducer head comprising
 (a) a composite magnetic core having first and second composite magnetic core parts with respective planar confronting surfaces secured in close confronting relationship with each other, with an interface region therebetween defining an interface plane of the composite magnetic core, said composite magnetic core having a transducer head record contacting surface for engagment with a magnetic record medium, and having a transducer head coupling gap at the interface region between the planar confronting surfaces of the composite magnetic core parts for coupling of the composite magnetic core with a portion of a magnetic record medium at said record contacting surface,
 (b) said first and second composite magnetic core parts having respective ferrite magnetic core elements and having notch configuration receiving respective magnetic pole piece layers of metallic magnetic material integrated with the respective ferrite magnetic core elements, the respective magnetic pole piece layers being disposed obliquely to the respective planar confronting surfaces of the composite magnetic core parts and having respective record confronting edges facing substantially flush with the record contacting surface, said record confronting edges being arranged substan- tially in a common straight line on said record contact surface and having respective gap defining pole piece edges at opposite sides of the interface region and defining the transducer head coupling gap, (c) The notch configurations of the respective core parts, as viewed at the record contacting surface, having first notch defining surfaces extending obliquely from the respective planar confronting surfaces of the respective core parts along a side of each respective one of the magnetic pole piece layers of metallic magnetic material in close conforming relation thereto, and having further notch defining surfaces forming extensions of the first notch defining surfaces which extend from the respective first notch defining surfaces and include respective lateral extremities laterally outwardly of the respective first notch defining surfaces, said lateral extremities of said further notch defining surfaces being located out of said record contacting surface, (d) said composite magnetic core having core lateral sides defining a core thickness dimension substantially greater than the width of the record contacting surface, the further notch defining surfaces having respective intermediate bends between the respective first notch defining surfaces and the respective lateral extremities, and the lateral extremities extending from the respective intermediate bends generally toward the interface plane, said lateral extremities being offset in a depth direction from the level of the record contacting surface to offset the lateral extremities from the level of a magnetic record medium at the record contacting surface.

2. A magnetic transducer according to claim 1, with the respective magnetic pole piece layers of metallic magnetic material lying substantially on a common straight line at least at said record contacting surface and having gap-defining edge faces parallel to the respective planar confronting surfaces of the core parts, the metallic magnetic material extending from the gap-defining edge faces along the first and further notch defining surfaces of each core part so as to define a respective first recess between the metallic magnetic material of each core part and the confronting surface, the respective core parts having respective further recesses on the respective opposite sides of the pole piece layers from the respective first recesses, said recesses being filled with non-magnetic material so as to concentrate coupling with the magnetic record medium at the transducer head coupling gap.

3. A magnetic transducer head according to claim 2, with the metallic magnetic material extending in close conforming relation with the respective further notch defining surfaces and extending from the respective intermediate bends in respective directions generally toward the interface plane but being offset in a depth direction from the level of the magnetic record medium in common with said further notch defining surfaces.

4. A magnetic transducer head according to claim 3, with the metallic magnetic material of the respective core parts having a substantially reduced layer thickness in the vicinity of the lateral extremities of the respective further notch defining surfaces in comparison to the thickness thereof forming the pole piece layers.

5. A magnetic transducer head according to claim 1, with the notch configurations of the respective composite magnetic core parts having respective intermediate bends and being such that the lateral extremities of the respective further notch defining surfaces extend from the respective intermediate bends generally toward the interface plane of the magnetic core, the metallic magnetic material extending in close conforming relation to the lateral extremities, and the metallic magnetic material at the respective lateral extremities being offset in a depth direction from the level of the record contacting surface so as to be clear of contact with a magnetic record medium being scanned by the transducer head.

6. A magnetic transducer head according to claim 5, with the metallic magnetic material being relatively thin at the lateral extremities in comparison to the thickness thereof forming the magnetic pole piece layers.

7. A magnetic transducer head according to claim 5, with said composite magnetic core having core lateral sides defining a core thickness dimension substantially greater than the width of the record contacting surface, the metallic magnetic material extending in close conforming relation to the lateral extremities of the further notch defining surfaces and terminating flush with the core lateral sides, said composite core parts having recesses interposed between metallic magnetic material of the respective magnetic core parts and the interface plane.

8. A magnetic transducer head according to claim 1, with the further notch defining surfaces having portions of the metallic magnetic material disposed in close conforming relation therewith, and said further notch defining surfaces and said portions of the metallic magnetic material conforming therewith extending from the respective pole piece layers so as to define a generally sinuous contour, the respective lateral extremities of the further notch defining surfaces being offset in a depth direction from the level of the record contacting surface.

9. A magnetic transducer head according to claim 8, with the metallic magnetic material being present at the lateral extremities of the further notch defining surfaces as a relatively thin layer in comparison to the thickness thereof providing the magnetic pole piece layers.

10. A magnetic transducer head according to claim 8, with the lateral extremities of the respective further notch defining surfaces terminating flush with the core lateral sides.

* * * * *